US008858126B2

(12) United States Patent
Morrison et al.

(10) Patent No.: US 8,858,126 B2
(45) Date of Patent: Oct. 14, 2014

(54) CUTTING TOOL WITH ERROR PROOFING FEATURE

(75) Inventors: Michael Glenn Morrison, Tarrs, PA (US); Srikanth Bontha, Monroeville, PA (US); Juan Seculi, Barcelona (ES); Thomas Jerry Long, II, Greensburg, PA (US); Jeremy Joseph Verellen, Jeannette, PA (US); Ravishankar Iyer, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 1209 days.

(21) Appl. No.: 12/567,129

(22) Filed: Sep. 25, 2009

(65) Prior Publication Data

US 2011/0076106 A1 Mar. 31, 2011

(51) Int. Cl.
*B23C 5/22* (2006.01)
*B23C 5/20* (2006.01)
*B23C 5/10* (2006.01)

(52) U.S. Cl.
CPC ............... *B23C 5/1045* (2013.01); *B23C 5/221* (2013.01); *B23C 2200/203* (2013.01); *B23C 2200/361* (2013.01); *B23C 2210/168* (2013.01)
USPC ................................ 407/34; 407/40; 407/113

(58) Field of Classification Search
CPC ..................................... B23C 5/20; B23C 5/22
USPC ............ 407/34, 43, 47, 48, 101–105, 35, 113
See application file for complete search history.

(56) References Cited

U.S. PATENT DOCUMENTS

| 3,341,921 | A | * | 9/1967 | Weller et al. | 407/104 |
|---|---|---|---|---|---|
| 3,341,923 | A | * | 9/1967 | Kelm | 407/104 |
| 3,343,431 | A | * | 9/1967 | Boyer | 408/153 |
| 3,354,526 | A | * | 11/1967 | Erkfritz | 407/40 |
| 4,566,828 | A | * | 1/1986 | Reinauer | 407/48 |
| 4,658,875 | A | * | 4/1987 | Grabovac | 144/230 |
| 4,979,849 | A | * | 12/1990 | Kezran | 407/107 |
| 5,004,378 | A | * | 4/1991 | Arai et al. | 407/106 |
| 6,409,435 | B1 | * | 6/2002 | Kocherovsky et al. | 407/104 |
| 6,913,426 | B2 | | 7/2005 | Horiike et al. | |
| 7,118,312 | B2 | | 10/2006 | Nordstrom et al. | |
| 7,192,227 | B2 | | 3/2007 | Nordstrom et al. | |
| 7,322,776 | B2 | | 1/2008 | Webb et al. | |
| 7,387,474 | B2 | | 6/2008 | Edler et al. | |
| 7,419,336 | B2 | * | 9/2008 | Lehto et al. | 407/35 |

(Continued)

FOREIGN PATENT DOCUMENTS

| CN | 1761547 A | 4/2006 |
|---|---|---|
| CN | 101505895 A | 8/2009 |

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A cutting tool includes a body having a forward end and a rearward end. The forward end includes an insert-receiving pocket with a threaded hole having a center axis. The cutting tool further includes a cutting insert with a countersunk bore with a center axis. The cutting tool includes an error proofing feature for preventing the cutting insert to be properly mounted in an insert-receiving pocket when an offset distance between the center axis of the threaded hole of the insert-receiving pocket and the center axis of the countersunk bore of the cutting insert is greater than a predetermined percentage of the outer diameter of the threaded screw.

11 Claims, 4 Drawing Sheets

(56) References Cited

U.S. PATENT DOCUMENTS

| | | |
|---|---|---|
| 7,794,182 B2 * | 9/2010 | Lehto et al. ............ 407/35 |
| 2002/0159846 A1 | 10/2002 | Horiike et al. |
| 2007/0177951 A1 * | 8/2007 | Sakamoto et al. ......... 407/40 |
| 2007/0245535 A1 | 10/2007 | Noggle |
| 2008/0138162 A1 | 6/2008 | Webb et al. |

FOREIGN PATENT DOCUMENTS

| | | | |
|---|---|---|---|
| GB | 2070472 A | * | 9/1981 |
| JP | 03123613 U | | 12/1991 |
| JP | 200319619 A | | 1/2003 |
| WO | WO 2007134930 A1 | * | 11/2007 |

* cited by examiner

CUTTING TOOL WITH ERROR PROOFING FEATURE

BACKGROUND OF THE INVENTION

The invention relates in general to a cutting tool, and in particular, to a cutting tool with an error proofing feature that prevents improper orientation of a cutting insert with the insert-receiving pocket of the cutting tool.

In a cutting tool that requires a cutting insert with non-symmetrical cutting edges to be placed in a specific pocket for a correct cutting edge profile to be achieved, the cutting tool should be provided with an error-proofing feature to prevent the end user from improperly orienting the cutting insert in the pocket.

BRIEF SUMMARY OF THE INVENTION

Briefly, according to an aspect of the invention, there is provided a cutting tool comprising a body having a forward end and a rearward end, the forward end including an insert-receiving pocket having a threaded hole with a center axis and capable of receiving a threaded screw having an outer diameter; and a cutting insert capable of being mounted within the insert-receiving pocket of the body. The cutting insert comprises a first substantially planar surface; a first curvilinear side surface and a second, opposite curvilinear side surface; a first cutting edge formed at an intersection between the first substantially planar surface and the first curvilinear side surface; a second cutting edge formed at an intersection between the first substantially planar surface and the second curvilinear side surface; a countersunk bore having a center axis and passing through the first and second substantially planar surfaces; and a first corner radius and a second, opposite corner radius formed between the first and second curvilinear side surfaces, a distance from the center axis of the countersunk bore to the first corner radius being different than a distance from the center axis of the countersunk bore to the second corner radius. The cutting insert can be properly mounted in the insert-receiving pocket when an offset distance between the center axis of the threaded hole of the insert-receiving pocket and the center axis of the countersunk bore of the cutting insert is less than or equal to a predetermined percentage of the outer diameter of the threaded screw. The cutting insert can not be properly mounted in the insert-receiving pocket when the offset distance between the center axis of the threaded hole of the insert-receiving pocket and the center axis of the countersunk bore of the cutting insert is greater than the predetermined percentage of the outer diameter of the threaded screw.

According to another aspect of the invention, there is provided a cutting tool comprising a body having a forward end and a rearward end, the forward end including an insert-receiving pocket having a threaded hole with a center axis and capable of receiving a threaded screw having an outer diameter; and a cutting insert capable of being mounted within the insert-receiving pocket of the body. The cutting insert comprises a first substantially planar surface; a first curvilinear side surface and a second, opposite curvilinear side surface; a first cutting edge formed at an intersection between the first substantially planar surface and the first curvilinear side surface; a second cutting edge formed at an intersection between the first substantially planar surface and the second curvilinear side surface; and a countersunk bore having a center axis and passing through the first and second substantially planar surfaces; a first corner radius and a second, opposite corner radius formed between the first and second curvilinear side surfaces, a distance from the center axis of the countersunk bore to the first corner radius being different than a distance from the center axis of the countersunk bore to the second corner radius. The cutting tool further comprises error-proofing means for preventing the cutting insert to be properly mounted in an incorrect insert-receiving pocket when an offset distance between the center axis of the threaded hole of the insert-receiving pocket and the center axis of the countersunk bore of the cutting insert is greater than a predetermined percentage of the outer diameter of the threaded screw.

According to yet another aspect of the invention, there is provided a method of manufacturing a cutting tool with an error proofing feature, the cutting insert includes a body having a forward end and a rearward end, the forward end including an insert-receiving pocket capable of receiving a threaded screw having an outer diameter; and a cutting insert including, the cutting insert capable of being mounted within the insert-receiving pocket of the body with the threaded screw, the method comprising:

forming a threaded hole with a center axis in the forward end of the insert-receiving pocket;

forming a countersunk bore in the cutting insert, the countersunk bore having a center axis that passes through first and second surfaces of the cutting insert, whereby the cutting insert can be properly mounted in the insert-receiving pocket when an offset distance between the center axis of the threaded hole of the insert-receiving pocket and the center axis of the countersunk bore of the cutting insert is less than or equal to a predetermined percentage of the outer diameter of the threaded screw, and whereby the cutting insert can not be properly mounted in the insert-receiving pocket when the offset distance between the center axis of the threaded hole of the insert-receiving pocket and the center axis of the countersunk bore of the cutting insert is greater than the predetermined percentage of the outer diameter of the threaded screw.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
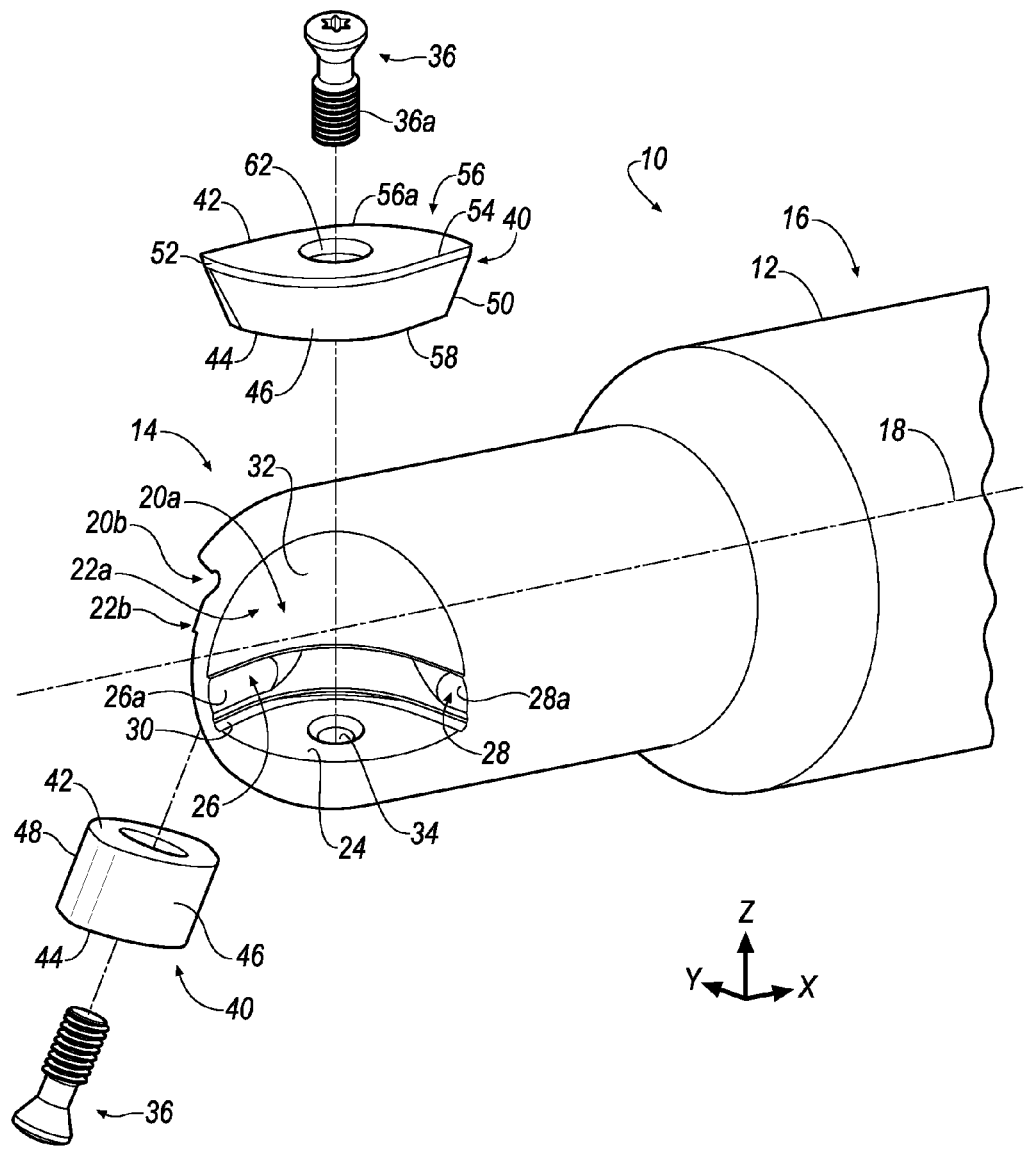
FIG. 1 is an exploded partial cutaway perspective view of a cutting tool and insert according to an embodiment of the invention.
Figure 2:
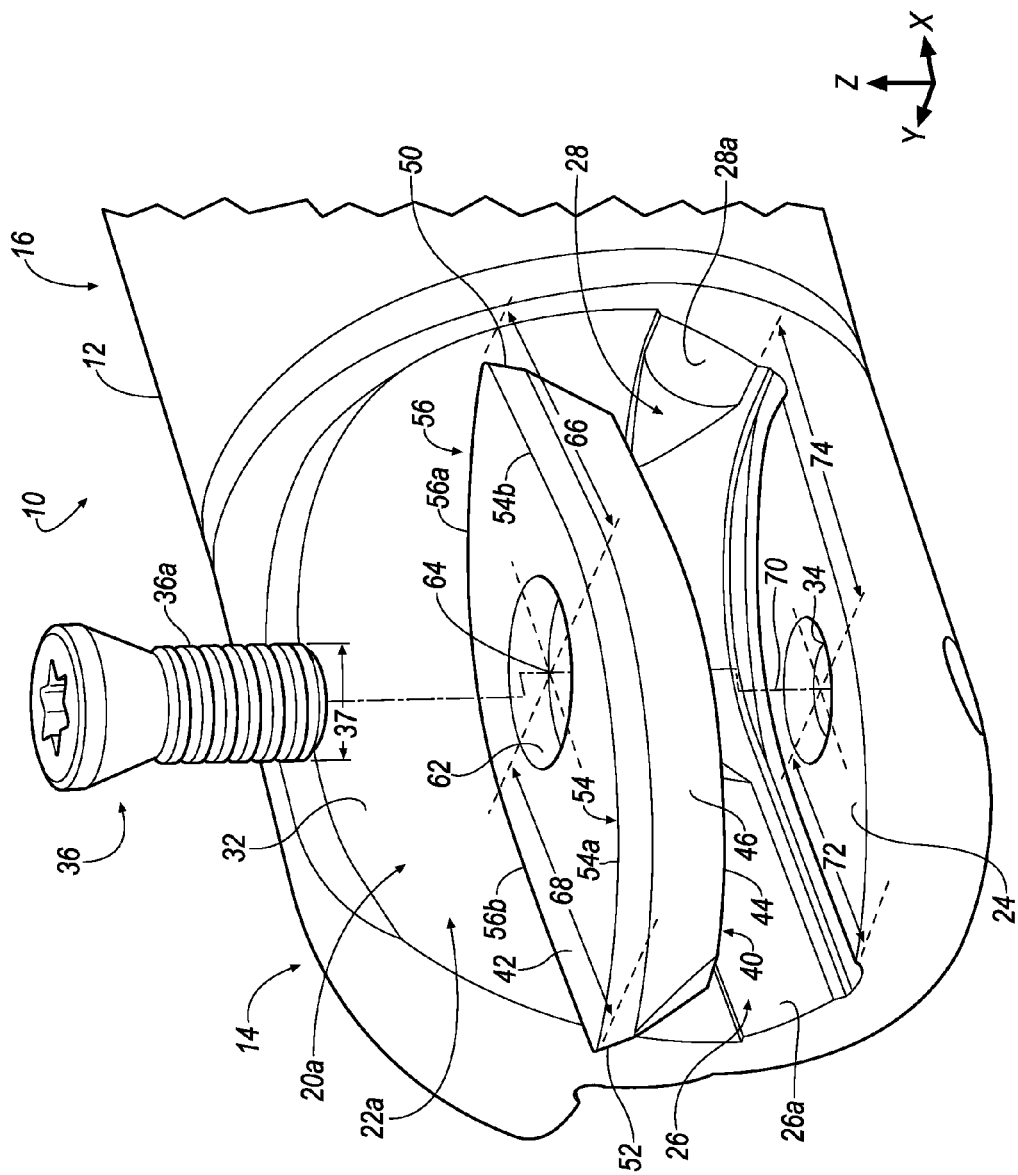
FIG. 2 is an enlarged view of the pocket of the cutting tool and the insert of FIG. 1.

Referring now to FIGS. 1 and 2, a cutting tool with an error proofing feature is shown generally at 10 according to an embodiment of the invention. For illustration purposes only, the cutting tool 10 comprises a ball end mill. However, it will be appreciated that the invention is not limited by the type of cutting tool, and that the invention can be practiced with any type of cutting tool having insert-receiving pockets. The ball end mill 10 includes a generally cylindrical body 12 having a generally hemispherical forward end 14 and a rearward end 16 that is adapted to be fixedly secured to a machine spindle (not shown) so that the body 12 can be rotated about a longitudinal axis 18 therethrough.

The generally hemispherical forward end 14 may be intersectioned by two recesses, each one comprising an insert-receiving pocket 20a, 20b and a chip pocket 22a, 22b. In the illustrated embodiment, the insert-receiving pockets 20a, 20b and the chip pockets 22a, 22b are substantially identical in construction. Thus, only the insert-receiving pocket 20a and the chip pocket 22a will be described herein. The insert-receiving pocket 20a includes a bottom support surface 24, an axial side support surface 26 and a radial side support surface 28. The axial side support surface 26 may include an axial abutment surface 26a, and the radial side support surface 28 may include a radial abutment surface 28a for engaging the cutting insert 40. A corner relief 30 is formed between the bottom support surface 24 and the axial and radial support surfaces 26, 28. A free surface 32 is provided between the axial and radial support surfaces 26, 28.

It will be appreciated that the invention is not limited by the number of insert-receiving pockets 20a, and that the invention can be practiced with any desirable number of insert-receiving pockets 20a. For example, the invention can be practiced with a ball end mill having only one insert-receiving pocket 20a, or a ball end mill having more than two insert-receiving pockets 20a.

A threaded hole 34 is provided in the center area of bottom support surface 24 for accommodating a threaded screw 36, which provides a means for clamping a cutting insert, shown generally at 40, into the insert-receiving pocket 20a, 20b. The threaded screw 36 has an outer diameter 37 defined by the outermost surface of the threads 36a. The threaded hole 34 may be through holes or blind holes. In the illustrated embodiment, the threaded hole 34 is shown as a through hole. It will be appreciated that the invention is not limited by the means for clamping the cutting insert 40 to the pocket 20a, and that the invention can be practiced using any means well-known to those skilled in the art for mounting the cutting insert 40 to the pocket 20a.

The cutting insert 40 includes a first substantially planar surface 42, a second, opposite substantially planar surface 44. The plane of the first surface 42 is substantially parallel to the plane formed by the second surface 44. The cutting insert 40 includes a first curvilinear side surface 46 and a second, opposite curvilinear side surface 48 (not visible in FIGS. 1 and 2), and a corner radius 50, 52 between the first and second curvilinear side surfaces 46, 48. The first and second side surfaces 46, 48 are substantially elliptical in shape.

The cutting insert 40 includes a first cutting edge 54 formed at the intersection between the first surface 42 and the first side surface 46, and a second cutting edge 56 formed at the intersection between the first surface 42 and the second side surface 48. Each cutting edge 54, 56 may comprise a first, curved portion 54a, 56a having a large radius and a second, rectilinear portion 54b, 56b. The radii of curvature of the first, curved portions 54a, 56a may be substantially uniform and equal. Depending on the cutting diameter of the tool 10, this radius of curvature may be between about 5 mm and about 20 mm. A countersunk bore 62 extends from the first surface 42 to the second surface 44 that enables the cutting insert 40 to be mounted in the insert-receiving pocket 20a. The cutting edges 54, 56 of the cutting insert 40 can be used in machining operations by rotating the cutting insert 40 about the z-axis approximately 180°.

In the illustrated embodiment, the cutting insert 40 is an asymmetric cutting insert, i.e., the cutting insert 40 has cutting edges at the intersection of either the first planar surface 42 or the second planar surface 44, but not both. Because of this asymmetry, the only way the cutting insert 40 can be properly mounted in the insert-receiving pocket 20a is that the first surface 42 becomes the top surface and the second surface 44 becomes the bottom surface such that the second surface 44 engages the bottom support surface 24 and the second side surface 48 (not visible in FIGS. 1 and 2) engages the axial and radial abutment surfaces 26a, 28a of the insert-receiving pocket 20a.

A center axis 64 of the countersunk bore 62 of the cutting insert 40 is formed at an offset with respect to the corner radiuses 50, 52 by a predetermined distance 66, 68, respectively. That is, the distance 66 from the center axis 64 to corner radius 50 is not equal to the distance 68 from the center axis 64 to the opposite corner radius 52. Similarly, a center axis 70 of the threaded hole 34 is formed at an offset with respect to the axial side support surface 26 and the radial side support surface 28 by a predetermined distance 72, 74, respectively. The distances 72, 74 are not equal to the distances 66, 68.

Figure 3:
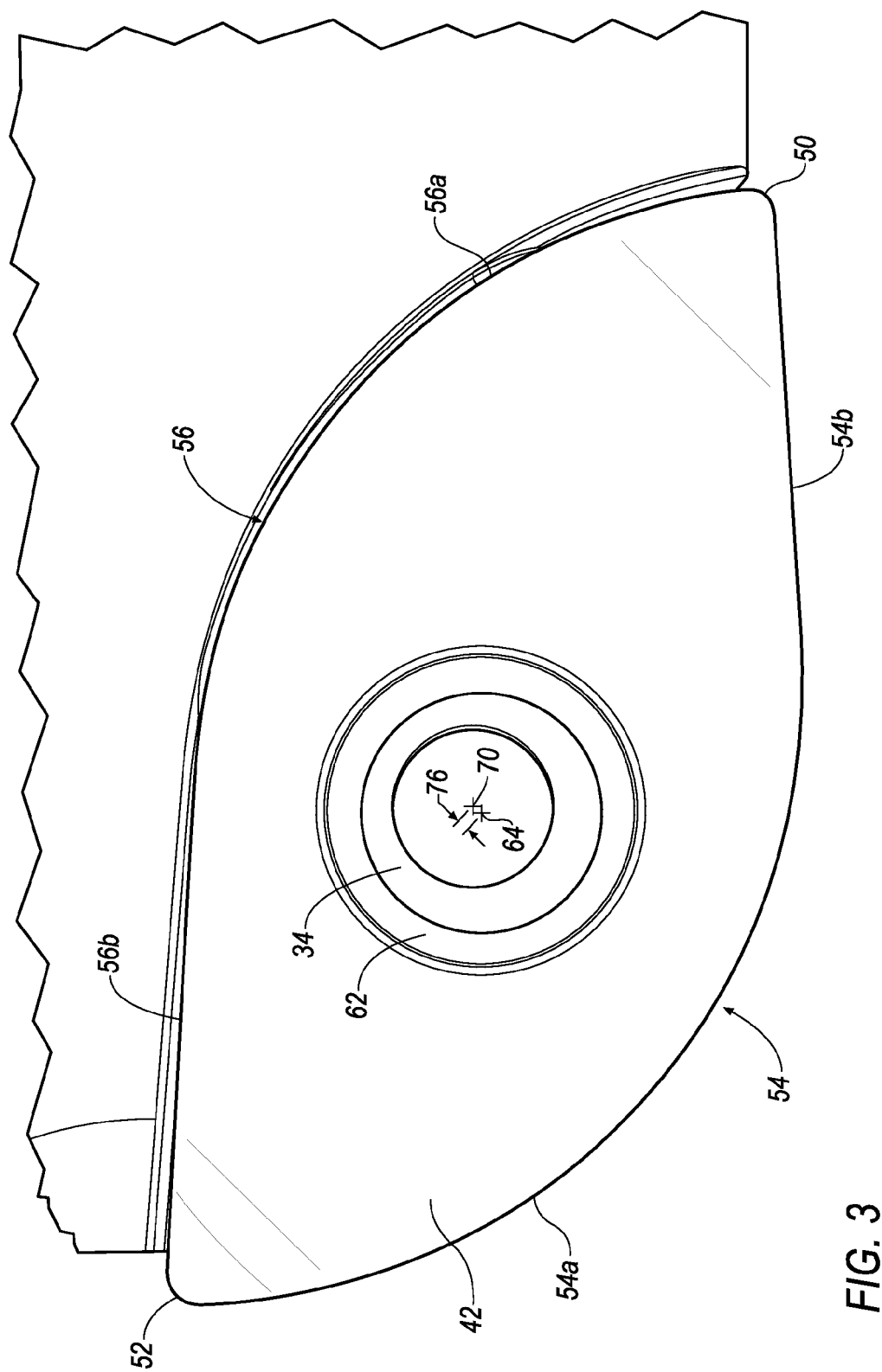
FIG. 3 is an enlarged top view of the cutting tool when the cutting insert is properly oriented with respect to the insert-receiving pocket of the cutting tool of FIG. 1.
Figure 4:
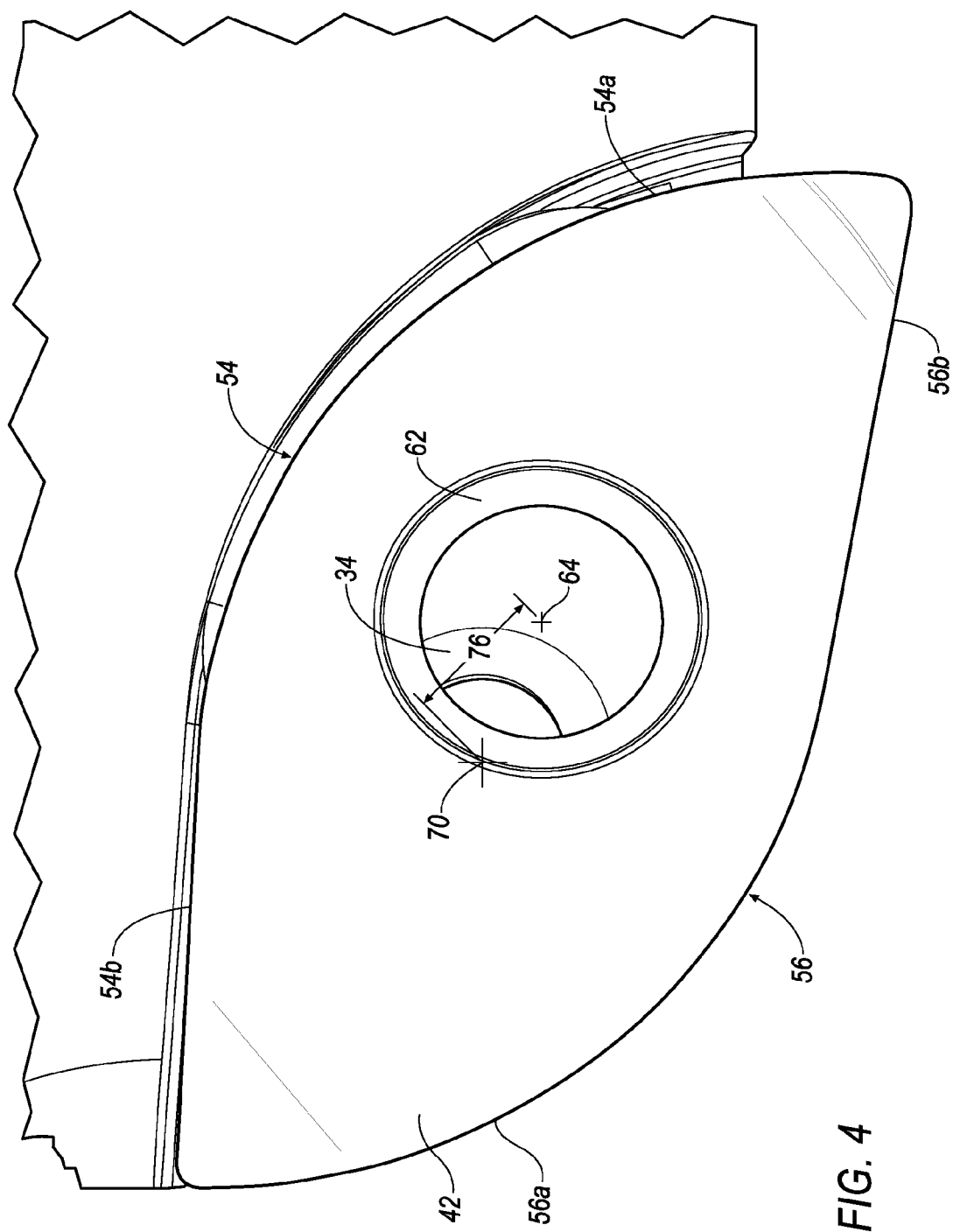
FIG. 4 is an enlarged top view of the cutting tool when the cutting insert is not properly oriented with respect to the insert-receiving pocket of the cutting tool of FIG. 1.

Referring now to FIGS. 3 and 4, one aspect of the invention is that the cutting tool 10, in combination with the cutting insert 40, includes an error proofing feature that prevents improperly mounting of the cutting insert 40 within the insert-receiving pocket 20a, 20b. In general, this is accomplished by allowing the threaded screw 36 to be received within the threaded bore 34 only when the cutting insert 40 is properly oriented with respect to the insert-receiving pocket 20a, 20b. More specifically, the threaded screw 36 can be received in the threaded hole 34 only when the countersunk bore 62 of the cutting insert 40 is substantially aligned with the threaded hole 34 of the insert-receiving pocket 20a, 20b, as shown in FIG. 3. Otherwise, it is impossible for the threaded screw 35 to be received in the threaded hole 34 because the countersunk bore 62 is not substantially aligned with the threaded hole 34, as shown in FIG. 4.

As shown in FIG. 3, the center axis 64 of the countersunk bore 62 is substantially aligned with the center axis 70 of the threaded hole 34 when the cutting insert 40 is properly oriented with respect to the insert-receiving pocket 20a, 20b. In reality, the center axis 70 of the threaded hole 34 is slightly offset by a distance 76 with respect to center axis 64 of the cutting insert 40. Specifically, the center axis 70 of the threaded hole 34 is slightly closer to the axial and radial side support surfaces 26, 28 than the center axis 64 of the cutting insert 40. This offset distance 76 causes the cutting insert 40 to move toward the axial and radial surfaces 26, 28 and firmly abut the surfaces 26a, 28a of the insert-receiving pocket 20a, 20b when the threaded screw 36 is received within the threaded hole 34.

In general, the cutting insert 40 can be properly mounted in the insert-receiving pocket 20a, 20b when the offset distance 76 between the center axis 70 of the threaded hole 34 of the insert-receiving pocket 20a, 20b and the center axis 64 of the countersunk bore 62 of the cutting insert 40 is less than or equal to about 5% of the outer diameter 37 of the threaded screw 36. On the other hand, the cutting insert 40 can not be properly mounted in the insert-receiving pocket 20a, 20b when the offset distance 76 between the center axis 70 of the threaded hole 34 of the insert-receiving pocket 20a, 20b and the center axis 64 of the countersunk bore 62 of the cutting insert 40 is greater than about 5% of the outer diameter 37 of the threaded screw 36.

As shown in FIG. 3, the user is attempting to mount the cutting insert 40 in the correct insert-receiving pocket 20a, 20b. In this example, the offset distance 76 is about 0.05 mm. In the case where the outer diameter 37 of the threaded screw 36 is about 3.00 mm, the offset distance 76 is about ((0.05/

3.00)×100), or about 1.7% of the outer diameter 37 of the threaded screw 36. Because the offset distance 76 is less than or equal to a predetermined percentage of the outer diameter 37 of the threaded screw 36, the cutting insert 40 can be properly mounted in the correct insert-receiving pocket 20*a*, 20*b*. In another embodiment, the predetermined percentage can be as high as about 5%.

As shown in FIG. 4, the user is attempting to mount the cutting insert 40 in the incorrect insert-receiving pocket 20*a*, 20*b*. In this example, the offset distance 76 is about 1.75 mm, or about ((1.75/3.00)×100), or about 58.3% of the outer diameter 37 of the threaded screw 36, which is much larger than the predetermined percentage of FIG. 3. This much larger offset distance as compared to the offset distance shown in FIG. 3 is attributable to the difference between the distances 66, 68 from the center axis 64 of the countersunk bore 62 and the difference between the distances 72, 74 from the center axis 70 of the threaded hole 34. Because the offset distance 76 is greater than the predetermined percentage of the outer diameter 37 of the threaded screw 36, the cutting insert 40 can not be properly mounted in the insert-receiving pocket 20*a*, 20*b*. In this manner, the cutting tool 10 provides an error proofing feature in which the cutting insert 40 can only be properly mounted in the correct insert-receiving pocket 20*a*, 20*b*.

In some embodiments, the predetermined percentage can be larger than 5% to prevent the cutting insert 40 from being mounted in the insert-receiving pocket 20*a*, 20*b*. In other embodiments, the offset distance 76 can be as little as about 2% of the outer diameter 37 of the threaded screw 36 so as to prevent the cutting insert 40 from being mounted in the insert-receiving pocket 20*a*, 20*b*.

As described above, the combination of the cutting tool and the cutting insert provides an error proofing feature that provides an error-proofing means for preventing mounting of the cutting insert in the incorrect insert-receiving pocket of the cutting tool 10.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tool, comprising:
   a body having a forward end and a rearward end, the forward end including an insert-receiving pocket having a threaded hole with a center axis and capable of receiving a threaded screw having an outer diameter; and
   a cutting insert capable of being mounted within the insert-receiving pocket of the body, the cutting insert comprising:
   a first substantially planar surface;
   a second substantially planar surface opposite the first substantially planar surface;
   a first curvilinear side surface and a second, opposite curvilinear side surface;
   a first cutting edge formed at an intersection between the first substantially planar surface and the first curvilinear side surface;
   a second cutting edge formed at an intersection between the first substantially planar surface and the second curvilinear side surface;
   a countersunk bore having a center axis and passing through the first and second substantially planar surfaces; and
   a first corner radius and a second, opposite corner radius formed between the first and second curvilinear side surfaces,
   wherein a distance from the center axis of the countersunk bore to the first corner radius is different than a distance from the center axis of the countersunk bore to the second corner radius, and
   wherein the cutting insert can be properly mounted in the insert-receiving pocket when an offset distance between the center axis of the threaded hole of the insert-receiving pocket and the center axis of the countersunk bore of the cutting insert is less than or equal to a predetermined percentage of the outer diameter of the threaded screw, and
   wherein the cutting insert can not be properly mounted in the insert-receiving pocket when the cutting insert is rotated 180 degrees with respect to the center axis of the countersunk bore, thereby causing an offset distance between the center axis of the threaded hole of the insert-receiving pocket and the center axis of the countersunk bore of the cutting insert to be greater than the predetermined percentage of the outer diameter of the threaded screw.

2. The cutting tool according to claim 1, wherein the predetermined percentage is less than or equal to about 5% of the outer diameter of the threaded screw.

3. The cutting tool according to claim 1, wherein the predetermined percentage is less than or equal to about 2% of the outer diameter of the threaded screw.

4. The cutting tool according to claim 1, wherein the center axis of the threaded hole is closer to axial and radial side support surfaces of the insert-receiving pocket than the center axis of the countersunk bore of the cutting insert, thereby causing the cutting insert to move toward the axial and radial side support surfaces and firmly abut the insert-receiving pocket when the cutting insert is properly mounted in the insert-receiving pocket and the threaded screw is received within the threaded hole.

5. The cutting tool according to claim 1, wherein the threaded hole of the insert-receiving pocket is formed at a first distance with respect to an axial side support surface of the insert-receiving pocket, and a second, different distance with respect to a radial side support surface.

6. A cutting tool, comprising:
   a body having a forward end and a rearward end, the forward end including an insert-receiving pocket having a threaded hole with a center axis and capable of receiving a threaded screw having an outer diameter; and
   a cutting insert capable of being mounted within the insert-receiving pocket of the body, the cutting insert comprising:
   a first substantially planar surface;
   a second substantially planar surface opposite the first substantially planar surface;
   a first curvilinear side surface and a second, opposite curvilinear side surface;
   a first cutting edge formed at an intersection between the first substantially planar surface and the first curvilinear side surface;
   a second cutting edge formed at an intersection between the first substantially planar surface and the second curvilinear side surface;
   a countersunk bore having a center axis and passing through the first and second substantially planar surfaces; and
   a first corner radius and a second, opposite corner radius formed between the first and second curvilinear side surfaces, a distance from the center axis of the countersunk bore to the first corner radius is different than a distance from the center axis of the countersunk bore to the second corner radius, thereby causing an offset distance between the center axis of the threaded hole of the insert-receiving pocket and the center axis of the countersunk bore of the cutting insert to be greater than a predetermined percentage of the outer diameter of the threaded screw when the cutting insert is rotated 180 degrees with respect to the center axis of the countersunk bore, thereby providing an error-proofing means for preventing the cutting insert to be mounted in the insert-receiving pocket.

7. The cutting tool according to claim 6, wherein the center axis of the threaded hole is offset by a distance with respect to the center axis of the cutting insert when the cutting insert is properly mounted in the insert-receiving pocket, thereby causing the cutting insert to move toward the axial and radial side support surfaces and firmly abut the insert-receiving pocket when the threaded screw is received within the threaded hole.

8. The cutting tool according to claim 6, wherein the predetermined percentage is less than or equal to about 5% of the outer diameter of the threaded screw.

9. The cutting tool according to claim 6, wherein the predetermined percentage is less than or equal to about 2% of the outer diameter of the threaded screw.

10. The cutting tool according to claim 6, wherein the center axis of the threaded hole is closer to axial and radial side support surfaces of the insert-receiving pocket than the center axis of the countersunk bore of the cutting insert.

11. The cutting tool according to claim 6, wherein the threaded hole of the insert-receiving pocket is formed at a first distance with respect to an axial side support surface of the insert-receiving pocket, and a second, different distance with respect to a radial side support surface.

\* \* \* \* \*